United States Patent
Helmich et al.

(10) Patent No.: US 9,923,960 B2
(45) Date of Patent: Mar. 20, 2018

(54) PARTITION BALANCING IN AN ON-DEMAND SERVICES ENVIRONMENT

(71) Applicant: salesforce.com, inc., San Francisco, CA (US)

(72) Inventors: Marco Helmich, San Francisco, CA (US); Vijayanth Devadhar, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 140 days.

(21) Appl. No.: 14/829,428

(22) Filed: Aug. 18, 2015

(65) Prior Publication Data

US 2017/0054797 A1    Feb. 23, 2017

(51) Int. Cl.
| | |
|---|---|
| *H04L 12/911* | (2013.01) |
| *H04L 29/08* | (2006.01) |
| *H04L 12/24* | (2006.01) |
| *G06F 17/30* | (2006.01) |
| *H04L 12/26* | (2006.01) |

(52) U.S. Cl.
CPC .... *H04L 67/1008* (2013.01); *G06F 17/30557* (2013.01); *G06F 17/30584* (2013.01); *H04L 41/0896* (2013.01); *H04L 41/5041* (2013.01); *H04L 43/04* (2013.01); *H04L 43/0817* (2013.01)

(58) Field of Classification Search
CPC ............... H04L 43/054; H04L 43/0541; H04L 43/0817; H04L 41/0896; H04L 41/5041; H04L 67/1008; G06F 17/30557; G06F 17/30584
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |

(Continued)

*Primary Examiner* — Scott B Christensen
(74) *Attorney, Agent, or Firm* — Alpine Technology Law Group LLC

(57) ABSTRACT

Techniques for partition balancing. Organization identifiers (orgIDs) are acquired for one or more organizations within a multi-organization on-demand services environment having multiple nodes, each of which have one or more partitions. A mapping of the orgIDs to the partitions within the multi-organization on-demand services environment is determined. Resource consumption for the organizations is determined. Resource consumption for the partitions based on the resource consumption of the organization and the mapping of the organization to the partitions is determined. A score for the partitions based on the resource consumption is generated. The partitions are redistributed among the nodes based on the partition scores.

20 Claims, 5 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,762,340 B2 * | 6/2014 | Paksoy ............. G06F 17/30336 707/640 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0288251 A1 * | 12/2006 | Jackson .............. G06F 11/1471 714/19 |
| 2009/0177744 A1 | 7/2009 | Marlow et al. |
| 2011/0213870 A1 * | 9/2011 | Cai .................. H04L 67/10 709/223 |
| 2011/0225165 A1 * | 9/2011 | Burstein ............ G06F 17/30336 707/741 |
| 2013/0054637 A1 * | 2/2013 | Dutta ................ G06F 17/30306 707/769 |
| 2013/0246356 A1 * | 9/2013 | Taylor ....................... G06F 8/65 707/629 |
| 2014/0136801 A1 * | 5/2014 | Birkestrand ............ G06F 12/00 711/153 |
| 2014/0372484 A1 * | 12/2014 | Baker ............... G06F 17/30575 707/781 |
| 2015/0134796 A1 * | 5/2015 | Theimer ............ G06F 17/30569 709/223 |

\* cited by examiner

PARTITION BALANCING IN AN ON-DEMAND SERVICES ENVIRONMENT

TECHNICAL FIELD

Embodiments relate to workload balancing between partitions within an on-demand services environment. More particularly, embodiments relate to techniques for efficiently managing workloads using information gathered from multiple layers of the on-demand services environment.

BACKGROUND

In complex computing environments (e.g., on-demand services, multitenant), providing of services and managing workloads can be complex. The common and straight forward solution is to assign partitions statically and as the system grows, add partitions to satisfy the growth. For example, in a multitenant environment, tenants may be added to a partition until a predetermined utilization threshold is reached. Subsequent tenants may be added to new partitions. However, this can lead to uneven distribution and overall system inefficiencies.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
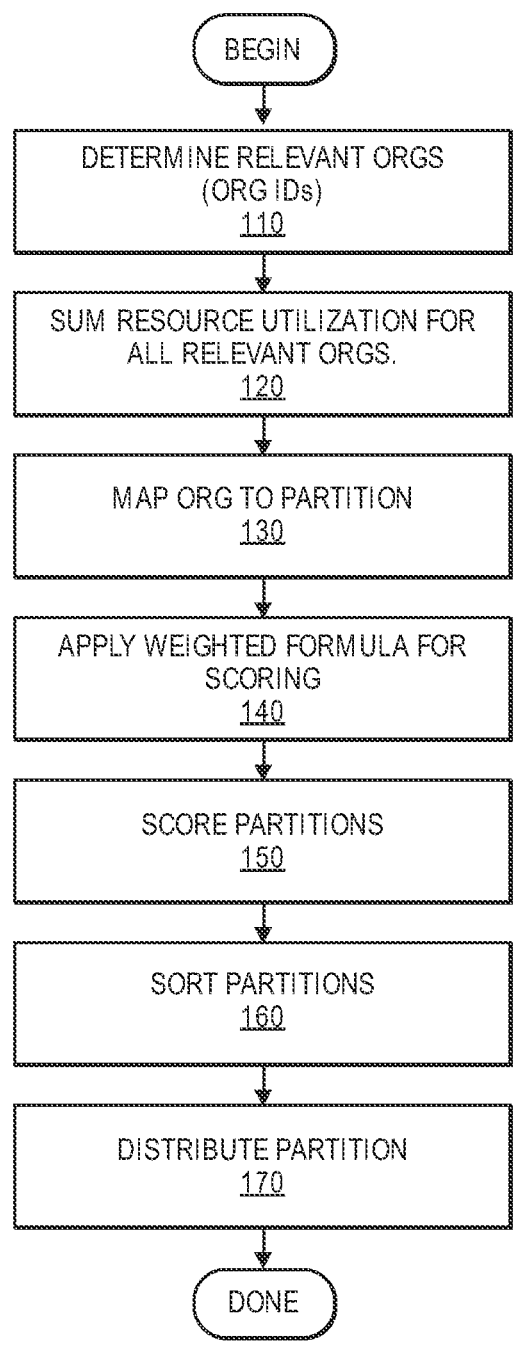
FIG. 1 is a flow diagram of one embodiment of a technique for partition balancing.

In the following description, numerous specific details are set forth. However, embodiments of the invention may be practiced without these specific details. In other instances, well-known circuits, structures and techniques have not been shown in detail in order not to obscure the understanding of this description.

The techniques described herein can be utilized to balance workloads across partitions in an on demand services environment, including, for example, a multitenant environment. For example, a multi-tenant database system utilizes tenant identifiers (IDs, organization identifiers or orgIDs) within the multi-tenant environment to allow individual tenants/organizations to access their data while preserving the integrity of data belonging to other tenants/organizations.

In one embodiment, the multitenant database stores data for multiple client entities each identified by a tenant ID (or orgID) having one of one or more users associated with the orgID. Users of each of multiple client entities can only access data identified by an orgID associated with their respective client entity. In one embodiment, the multitenant database is a hosted database provided by an entity separate from the client entities, and provides on-demand and/or real-time database service to the client entities.

Databases can be organized as clusters (e.g., Oracle® Real Application Clusters, or, RAC nodes) that allow multiple computers to run database management software simultaneously while accessing a single database. Use of clustering in database environments can provide improved performance, scalability and/or resilience. Thus, resolving an orgID to a target cluster node can be accomplished using a two-step lookup process.

The first lookup maps the orgID to a partition number. In one embodiment, this mapping is static and is set at creation time of the orgID. The second lookup maps a partition to a cluster node. This second mapping is flexible and can be modified at runtime for multiple purposes, for example, high availability. If, for example, a cluster node crashes, the partitions corresponding to that cluster node can be remapped automatically to different nodes to avoid service interruptions. This mapping can also be used to balance traffic across nodes.

In one embodiment, partitions can be a unit of load balancing across nodes. In one embodiment, partitions are a unit of load balancing across nodes of a pod. A pod is one or more databases, a collection of application servers and supporting services (e.g., search, binary storage) that services one or more tenants/organizations. For example, a pod can be a relational database system (e.g., an Oracle® database) that can be configured as a cluster (e.g., by Oracle's Real Application Cluster (RAC) architecture) across multiple (e.g., 8, 4, 16) physical devices.

The load balancing descriptions herein are based on processor load and other factors. However, the term "load balancing" does not refer only to processor consumption, but to all possible factors influencing performance. For example, nodes may have only a limited number of connections and usage of these connections can be considered load. Another example could be the cache hit ratio where a low cache hit ratio could indicate high competition for main memory on the database. Load balancing can be based on these and other factors as well.

Because orgID to partition mapping may be fixed, partitions can provide an efficient unit for load balancing purposes. However, the task of mapping partitions to nodes can have a relatively high cost. One factor contributing to this relatively high cost is that there may not be much visibility (or even trending) into resource utilization for a tenant/organization. On a partition level, little or no monitoring may exist. Visibility may be generated manually by rolling up log data to partition level and joining the log data with live database statistics (organization to partition mapping). This process can be time-consuming and labor-intensive.

Another factor is that the data can be constantly changing due to, for example, growth of the organization. Thus, a mapping may be quickly outdated and may not result in optimal balancing. The techniques described herein can more effectively distribute resource consumption across multiple nodes. The techniques described herein can further operate to generate visibility into organization-level and partition-level resource consumption and/or increase automation of partition to node mapping.

In one embodiment, a partition balancing tool measures database usage on the organization and the partition level to provide partition to node mapping with improved partition-level load balancing. In one embodiment, the on-demand services environment includes a framework for distributed storage and distributed processing of large data sets on computing clusters. Examples of these types of frameworks include Hadoop from the Apache Software Foundation and gridforce from salesforce.com. In one embodiment, additional packages can be utilized along with the framework including, for example, Pig, Hive, HBase and/or Spark available from the Apache Software Foundation. In alternate embodiments, one or more equivalent/similar packages can be utilized.

In one embodiment, the desired data can be acquired by processing logs that are streamed "live" from the framework. Further, the database system can be queried for relevant data that can be merged with the logs. The combined query result and logs can be utilized to provide partition balancing. The partition balancing can be as simple as allocating based on processor workload caused by the database system, or, as described in greater detail below, more complex.

Logs are only one possible source of data. The framework discussed herein is designed to be able to consume different sources of data where the live system is monitored from different angles. Other examples of data sources could be sampling of database session data, database sessions are being tagged with the orgId, etc.

FIG. 1 is a flow diagram of one embodiment of a technique for partition balancing. The relevant organizations are determined, 110. In one embodiment, this may be all of the organizations within the environment. In other embodiments, this may be a subset of organizations within the environment. In one embodiment, the orgIDs for each of the relevant organizations are determined and maintained in a list or table.

In one embodiment, the techniques described herein can be accomplished, at least in part, by utilizing a driver and a corresponding script (e.g., a Pig script) that operate within the framework described above. In one embodiment, the driver operates in three phases: 1) gathering data from the database and the framework; 2) running the script on the gathered data; and 3) utilizing the result data from running the script.

In one embodiment, the driver operates to query the database system for orgID to partition mapping information and stores that information in the framework (e.g., in a Hadoop embodiment, within the Hadoop Distributed File System, or HDFS). This makes the mapping information available to the script. In one embodiment, in order to generate this data, an organization table or other data set is queried within the database.

Resource utilization is determined for all relevant organizations, 120. In one embodiment, the script loads all log record types that have corresponding database statistics, extracts relevant statistical information (e.g., processor consumption, bandwidth utilization, memory utilization, physical reads, physical writes, buffergets), and sums the statistical information by orgID. In an example processor consumption embodiment, the result can be the following example statistics alias: orgId, sum(databaseProcessor). In other embodiments, different and/or more statistical information can be utilized.

In one embodiment, the statistics alias can be joined with the orgID to partition mapping, 130, which results in the following example alias: orgId, partitionNumber, databaseProcessor. From this data, the orgID column can be thrown out and the data can be grouped by partition number. This results in the following example alias: partitionNumber, sum(databaseProcessor). This is a simple example that can provide useful partition balancing; however, more complex embodiments, for example, using the statistics discussed above (or others) can also be used to provide a more sophisticated embodiment. Further, when using multiple statistics types, one or more of the statistics can be weighted, 140.

In one embodiment, as a result of the operations and analysis discussed above, each partition can be assigned a "hotness" value, 140. This hotness value can be utilized to score partitions, 150 and sort partitions, 160. In one embodiment, this hotness criteria is a single number that is the result of analysis of using differently weighted statistics that are captured. In one embodiment, after the hotness criteria are determined rows are sorted in descending order (i.e., hottest partition on top). In one embodiment, this is the end of functionality provided by the script.

Partitions are distributed, 170. In one embodiment, data is copied from the framework (e.g., HDFS) to a durable storage (e.g., the database). In one embodiment, databases do not allow storing of files without an organization affiliation (e.g., orgID). In one embodiment, generated usage data (e.g., orgId to usage, partitionNumber to usage, partitionNumber to hotness) can be stored as a character large object (clob) in a designated table so that capacity planning components can query the data utilize the data in the partition distribution process.

In one embodiment, from the partition to hotness information, the driver can generate a partition to node mapping recommendation. In one embodiment, a recommendation engine utilizes the partition to hotness list and the list of currently available nodes, and assigns partitions to nodes. In one embodiment, the hottest partition is assigned to the emptiest node, and that process is repeated until all partitions are assigned. Other assignment processes can also be utilized.

In one embodiment, the node representations are maintained in a sorted set. The set can be sorted by anticipated usage. The next partition will be assigned to the node at the bottom of the sorted set. The resulting mapping can be implemented automatically or can be provided to a system administrator to be handled manually.

Figure 2:
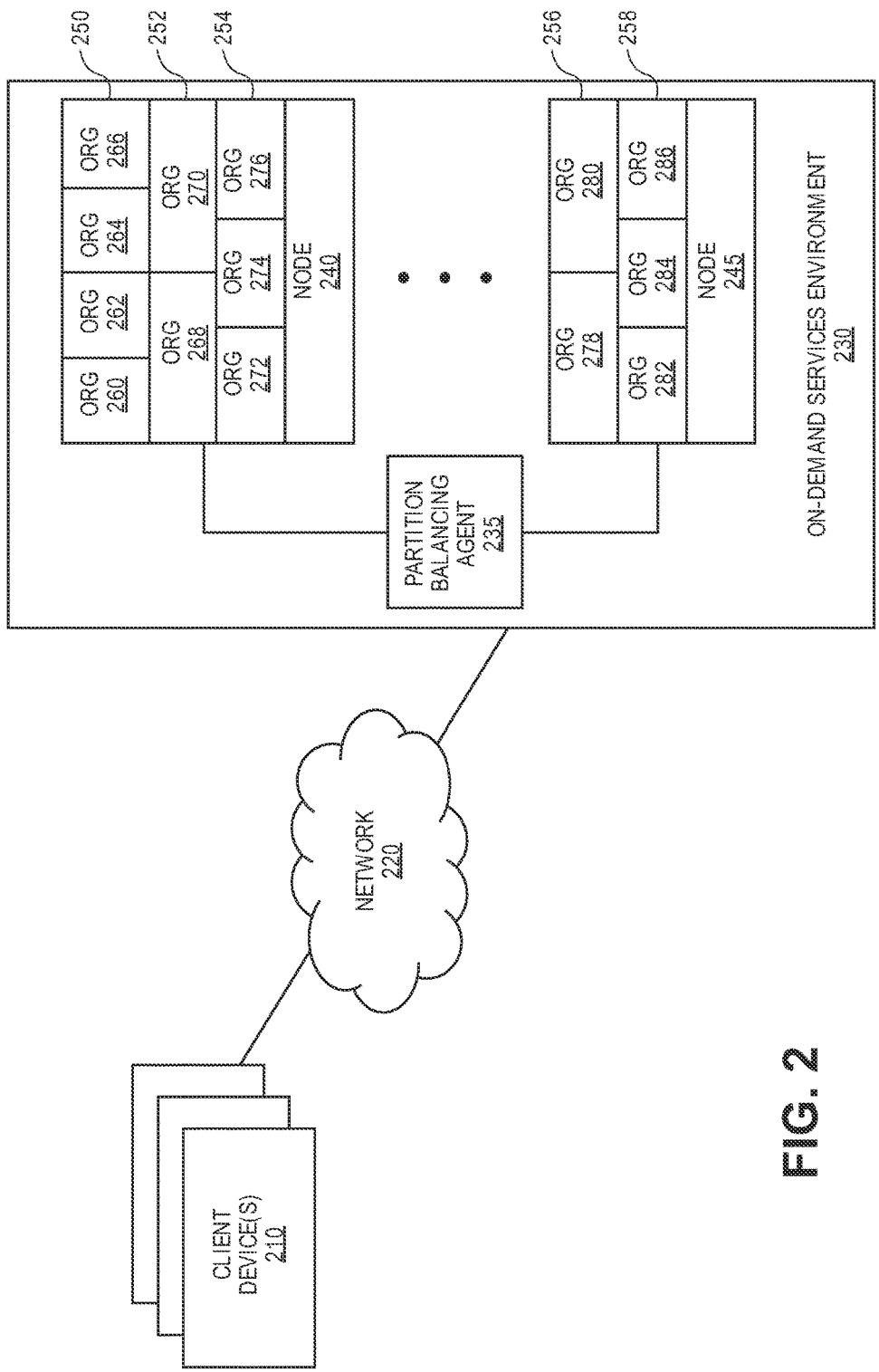
FIG. 2 is a block diagram of one embodiment of an architecture having an on-demand services environment supporting partition balancing.

FIG. 2 is a block diagram of one embodiment of an architecture having an on-demand services environment supporting partition balancing. In one embodiment, one or more client device(s) 210 are connected to on-demand services environment 230 via network 220. Network 220 can be any type of wired or wireless networks or any combination thereof. For example, network 220 can be some combination of one or more local area networks, one or more corporate networks and the Internet.

In one embodiment, partition balancing agent 235 provides some or all of the functionality described above within on-demand services environment 230. The example of FIG. 2 provides an example snapshot of organizations within two nodes (e.g., 240, 245); however, any number of nodes and/or any number of organization and/or any number of partitions can be supported.

In the example of FIG. 2, node 240 includes partitions 250, 252 and 254. Node 245 includes partitions 256 and 258. Each partition supports one or more organizations. For example, partition 250 supports organizations 260, 262, 264 and 266, partition 252 supports organizations 268 and 270, and partition 254 supports organizations 272, 274 and 276. Similarly, partition 256 supports organizations 278 and 280, and partition 258 supports organizations 282, 284 and 286.

As described above, partition balancing agent 235 can determine hotness criteria for the organizations of on-demand services environment 230. Using these hotness criteria, partition balancing agent 235 can cause one or more of the partitions to be moved to a different nodes and/or provide a recommendation for movement of one or more of the partitions to a different node. In one embodiment, partition balancing agent 235 can be responsible for generating new partitions to be populated by one or more organizations.

Figure 3:
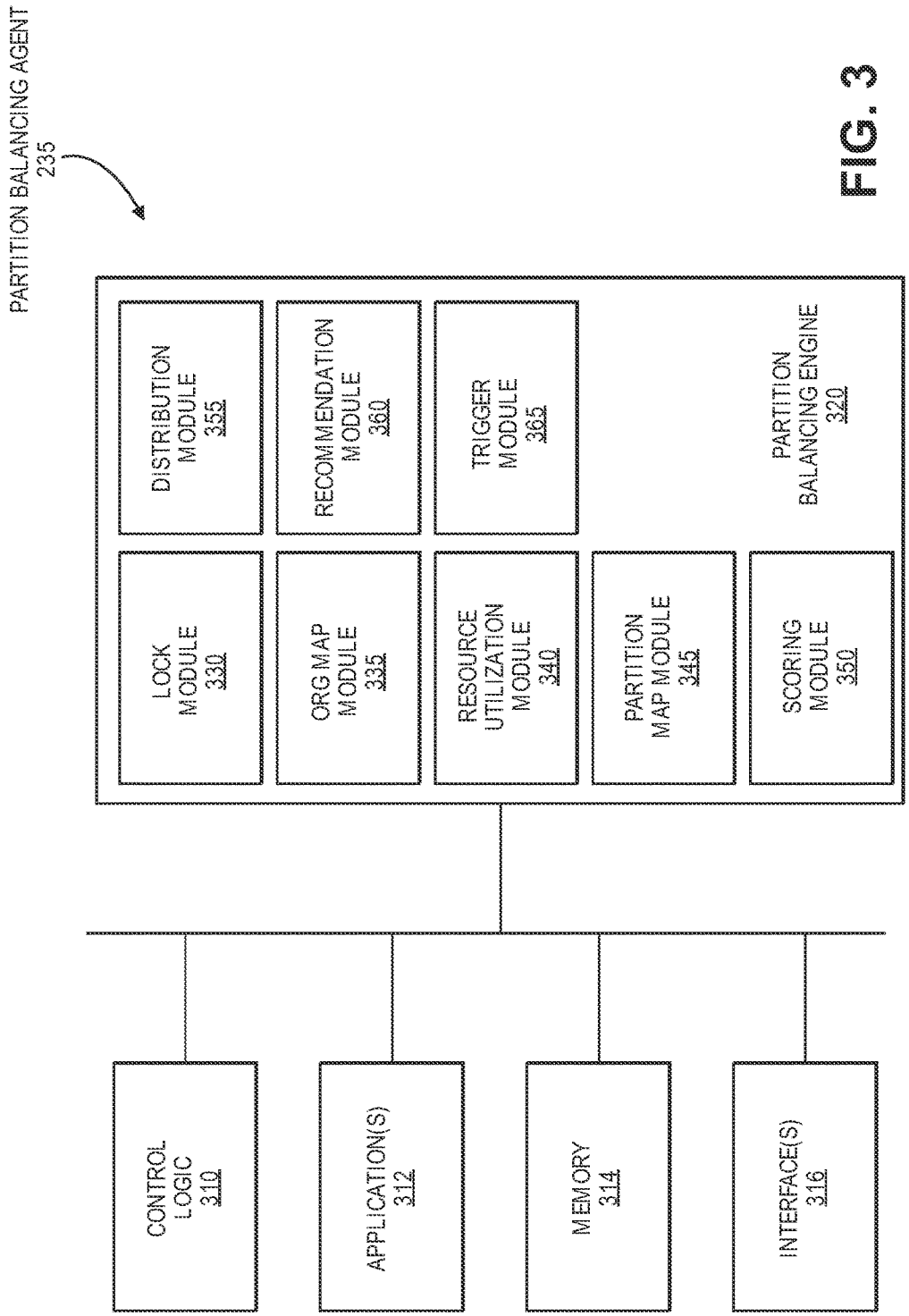
FIG. 3 is a block diagram of one embodiment of a partition balancing agent.

FIG. 3 is a block diagram of one embodiment of a partition balancing agent. In one embodiment, Partition balancing agent 235 includes control logic 310, which implements logical functional control to direct operation of partition balancing agent 235, and/or hardware associated with directing operation of partition balancing agent 235. Logic may be hardware logic circuits and/or software routines. In one embodiment, partition balancing agent 235 includes one or more applications 312, which represent code sequence and/or programs that provide instructions to control logic 310.

Partition balancing agent 235 includes memory 314, which represents a memory device and/or access to a memory resource for storing data and/or instructions. Memory 314 may include memory local to partition balancing agent 235, as well as, or alternatively, including memory of the host system on which partition balancing agent 235 resides. Partition balancing agent 235 also includes one or more interfaces 316, which represent access interfaces to/from (an input/output interface) partition balancing agent 235 with regard to entities (electronic or human) external to partition balancing agent 235.

Partition balancing agent 235 also includes partition balancing engine 320, which represents one or more functions or module that enable partition balancing agent 235 to provide the indexing services as described above. The example of FIG. 3 provides several modules that may be included in partition balancing engine 320; however, different and/or additional modules may also be included. Example modules that may be involved in providing the indexing functionality include lock module 330, organization map module 335, resource utilization module 340, partition map module 345, scoring module 350, distribution module 355, recommendation module 360 and/or trigger module 365.

In one embodiment, lock module 330 operates to acquire locks (or to cause locks to be acquired) on one or more applications as described above. In one embodiment, one of the first steps of the partition balancing process is to acquire locks applications. Any technique known in the art for locks may be utilized.

In one embodiment, organization map module 335 maps and/or maintains a mapping between organizations and partitions. In one embodiment, the organization map module 335 operates to query the database system for orgID to partition mapping information and stores that information (e.g., in a Hadoop embodiment, within the Hadoop Distributed File System, or HDFS).

In one embodiment, resource utilization module 340 operates to determine resource utilization for one or more organizations. In one embodiment, the resource utilization module 340 analyzes log record types that have corresponding database statistics, extracts relevant statistical information (e.g., processor consumption, bandwidth utilization, memory utilization, physical reads, physical writes, buffergets), and sums the statistical information by orgID.

In one embodiment, partition map module 345 maps and/or maintains a mapping between partitions and organization. Resource utilization module 340 and/or partition map module 345 can join the statistical information with the organization to partition mapping to provide partition utilization information.

In one embodiment, scoring module 350 operates to generate the hotness criteria discussed above. In one embodiment, scoring module 350 operates to generate the hotness criteria based on processor utilization by organization. In other embodiments, many other factors can be utilized including, for example, bandwidth utilization, memory utilization, physical reads, physical writes, buffergets, and others. In one embodiment, scoring module 350 applies a weighting value to one or more of the utilization measures.

In one embodiment, distribution module 355 operates to automatically redistribute (or cause to be redistributed) one or more partitions based on the hotness criteria. In one embodiment, recommendation module 360 provides partition distribution recommendations to one or more parties based on the hotness criteria. In one embodiment, partition balancing engine 320 includes only one of distribution module 355 and recommendation module 360. In another embodiment, partition balancing engine 320 can include both distribution module 355 and recommendation module 360 that can work together to provide partition balancing as described herein.

In one embodiment, trigger module 365 operates to trigger the partition balancing functionality described herein. In one embodiment, trigger module 365 starts the process on a defined schedule (e.g., once a day, once a week, hourly). In another embodiment, trigger module 365 can start the partition balancing process in response to a condition or event (e.g., a preselected number of new organizations, a new partition, a crash, resource utilization over a preselected threshold).

Figure 4:
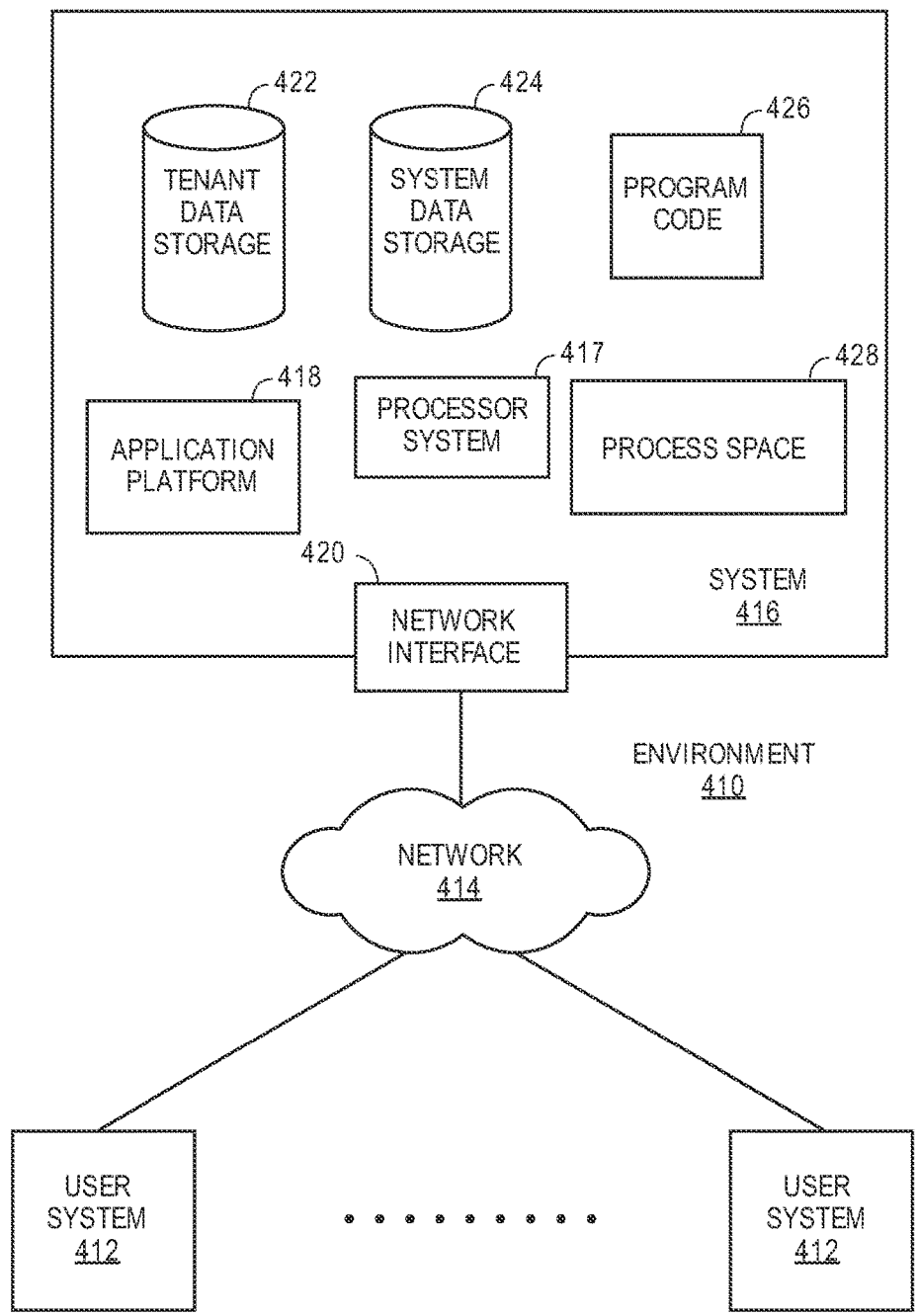
FIG. 4 is a block diagram of one environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
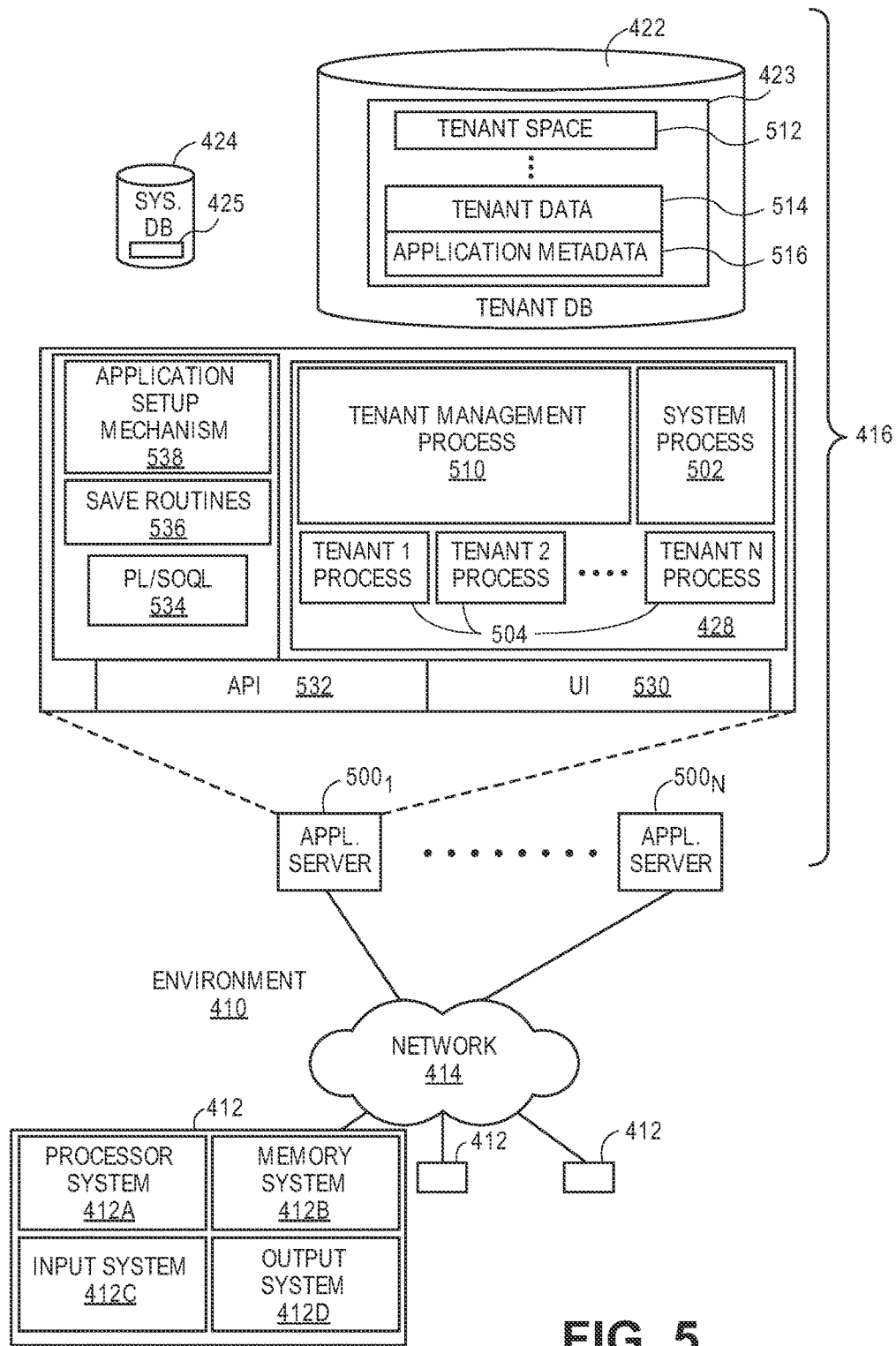
FIG. 5 is a block diagram of one embodiment of elements of environment of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D.

FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$400_N$, system process space 502, tenant process spaces 504, tenant management process space 510, tenant storage space 512, tenant data 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage spaces 512, which can be either a physical arrangement and/or a logical arrangement of data. Within each tenant storage space 512, tenant data 514 and application metadata 516 might be similarly allocated for each user. For example, a copy of a user's most recently used (MRU) items might be stored to tenant data 514. Similarly, a copy of MRU items for an entire organization that is a tenant might be stored to tenant storage space 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
acquiring organization identifiers (orgIDs) for one or more relevant organizations of a plurality of organizations within a multi-organization on-demand services environment having multiple computing nodes, each of which have one or more partitions, wherein each relevant organization utilizes each of the partitions to which it is assigned, wherein each organization within the multi-organization on-demand services environment is uniquely identified by a single orgID, and wherein each partition is configured to be associated with multiple organizations of the plurality of organizations and is further configured to be executed by a single computing node of the multiple computing nodes;
determining a mapping of the orgIDs to the partitions within the multi-organization on-demand services environment, wherein the mapping is static and is set in association with creation of the orgID;
determining a mapping of partitions to computing nodes, where multiple partitions are mapped to each computing node, wherein the mapping of partitions to computing nodes is dynamic and can be modified at runtime;
determining, based on the acquired orgIDs, first resource consumptions for the relevant organizations;
determining second resource consumptions for each of the partitions based on the first resource consumptions for the relevant organizations and the mapping of the relevant organizations to the partitions;
generating a partition score for each of the partitions based on the second resource consumptions;
redistributing the partitions with corresponding relevant organizations among the computing nodes based on the partition scores.

2. The method of claim 1 wherein the on-demand services environment comprises at least databases organized as nodes that allow multiple computing devices to run database management software simultaneously while accessing a single database instance.

3. The method of claim 1 wherein determining the first resource consumptions for the relevant organizations comprises:
loading log record types that have database statistics; and
extracting relevant statistical information.

4. The method of claim 3 wherein the statistical information comprises one or more of: processor consumption, bandwidth utilization, memory utilization, physical reads, physical writes, and buffergets.

5. The method of claim 4 wherein a weighting value is applied to at least some of the statistical information.

6. The method of claim 1 wherein acquiring organization identifiers (orgIDs) for one or more relevant organizations within a multi-organization on-demand services environment having multiple computing nodes, each of which have one or more partitions comprises:
querying a database system for orgID to partition mapping information; and
storing the orgID to partition mapping in a file system framework.

7. The method of claim 1 wherein determining the second resource consumptions for the partitions based on the resource consumption of the organization and the mapping of the relevant organization to the partitions comprises joining the statistical information with the orgID to partition mapping.

8. A non-transitory computer readable medium having stored thereon instruction that, when executed by one or more processors, cause the one or more processors to:
acquire organization identifiers (orgIDs) for one or more relevant organizations of a plurality of organizations within a multi-organization on-demand services environment having multiple computing nodes, each of which have one or more partitions, wherein each relevant organization utilizes each of the partitions to which it is assigned, wherein each organization within the multi-organization on-demand services environment is uniquely identified by a single orgID, and wherein each partition is configured to be associated with multiple organizations of the plurality of organizations and is further configured to be executed by a single computing node of the multiple computing nodes;
determine a mapping of the orgIDs to the partitions within the multi-organization on-demand services environment, wherein the mapping is static and is set in association with creation of the orgID;
determine a mapping of partitions to computing nodes, where multiple partitions are mapped to each computing node, wherein the mapping of partitions to computing nodes is dynamic and can be modified at runtime;
determine, based on the acquired orgIDs, first resource consumptions for the relevant organizations;
determine second resource consumptions for each of the partitions based on first resource consumptions for the relevant organizations and the mapping of the relevant organizations to the partitions;
generate a partition score for each of the partitions based on the second resource consumptions;
redistribute the partitions with corresponding relevant organizations among the computing nodes based on the partition scores.

9. The non-transitory computer readable medium of claim 8 wherein the on-demand services environment comprises at least databases organized as nodes that allow multiple computing devices to run database management software simultaneously while accessing a single database instance.

10. The non-transitory computer readable medium of claim 8 wherein determining the first resource consumptions for the relevant organizations comprises:
loading log record types that have database statistics; and
extracting relevant statistical information.

11. The non-transitory computer readable medium of claim 10 wherein the statistical information comprises one or more of: processor consumption, bandwidth utilization, memory utilization, physical reads, physical writes, and buffergets.

12. The non-transitory computer readable medium of claim 11 wherein a weighting value is applied to at least some of the statistical information.

13. The non-transitory computer readable medium of claim 8 wherein acquiring organization identifiers (orgIDs) for one or more relevant organizations within a multi-organization on-demand services environment having multiple computing nodes, each of which have one or more partitions comprises:
querying a database system for orgID to partition mapping information; and
storing the orgID to partition mapping in a file system framework.

14. The non-transitory computer readable medium of claim 8 wherein determining the second resource consumptions for the partitions based on the resource consumption of the organization and the mapping of the relevant organization to the partitions comprises joining the statistical information with the orgID to partition mapping.

15. A system comprising:
   at least one memory device;
   one or more hardware processing devices coupled with the at least one memory device, the one or more hardware processing devices configurable to acquire organization identifiers (orgIDs) for one or more relevant organizations of a plurality of organizations within a multi-organization on-demand services environment having multiple computing nodes, each of which have one or more partitions, wherein each relevant organization utilizes each of the partitions to which it is assigned, wherein each organization within the multi-organization on-demand services environment is uniquely identified by a single orgID, and wherein each partition is configured to be associated with multiple organizations of the plurality of organizations and is further configured to be executed by a single computing node of the multiple computing nodes, to determine a mapping of the orgIDs to the partitions within the multi-organization on-demand services environment, wherein the mapping is static and is set in association with creation of the orgID, to determine a mapping of partitions to computing nodes, where multiple partitions are mapped to each computing node, wherein the mapping of partitions to computing nodes is dynamic and can be modified at runtime, to determine, based on the acquired orgIDs, first resource consumptions for the relevant organizations, to determine second resource consumptions for each of the partitions based on first resource consumptions for the relevant organizations and the mapping of the relevant organizations to the partitions, to generate a partition score for each of the partitions based on the second resource consumptions, and to redistribute the partitions with corresponding relevant organizations among the computing nodes based on the partition scores.

16. The system of claim 15 wherein the on-demand services environment comprises at least databases organized as nodes that allow multiple computing devices to run database management software simultaneously while accessing a single database instance.

17. The system of claim 15 wherein determining the first resource consumptions for the relevant organizations comprises loading log record types that have database statistics and extracting relevant statistical information.

18. The system of claim 17 wherein the statistical information comprises one or more of: processor consumption, bandwidth utilization, memory utilization, physical reads, physical writes, and buffergets.

19. The system of claim 18 wherein a weighting value is applied to at least some of the statistical information.

20. The system of claim 15 wherein acquiring organization identifiers (orgIDs) for one or more relevant organizations within a multi-organization on-demand services environment having multiple computing nodes, each of which have one or more partitions comprises querying a database system for orgID to partition mapping information and storing the orgID to partition mapping in a file system framework.

* * * * *